United States Patent
Ramanathan et al.

(10) Patent No.: US 8,666,152 B1
(45) Date of Patent: Mar. 4, 2014

(54) DIGITAL VIDEO CONTENT FINGERPRINTING USING IMAGE PIXEL INTENSITY AND COLOR INFORMATION

(75) Inventors: Prashant Ramanathan, Mountain View, CA (US); Mihailo Stojancic, San Jose, CA (US)

(73) Assignee: Zeitera, LLC, Sunnyvale, CA (US)

( * ) Notice: Subject to any disclaimer, the term of this patent is extended or adjusted under 35 U.S.C. 154(b) by 559 days.

(21) Appl. No.: 12/955,416

(22) Filed: Nov. 29, 2010

Related U.S. Application Data

(60) Provisional application No. 61/266,668, filed on Dec. 4, 2009.

(51) Int. Cl.
*G06K 9/00* (2006.01)

(52) U.S. Cl.
USPC .......................................... 382/162; 382/168

(58) Field of Classification Search
USPC ................................. 382/162, 168
See application file for complete search history.

(56) References Cited

U.S. PATENT DOCUMENTS

| | | | |
|---|---|---|---|
| 2010/0074538 A1* | 3/2010 | Mishra et al. | 382/224 |
| 2011/0085697 A1* | 4/2011 | Clippard et al. | 382/100 |

OTHER PUBLICATIONS

Ferman, A. Mufit—"Robust Color Histogram Descriptors for Video Segment Retrieval and Identification"—2002 IEEE, pp. 497-508.*
Ohm, Jens-Rainer—"The MPEG-7 Color Descriptors"—2001.*

* cited by examiner

*Primary Examiner* — Bernard Krasnic
(74) *Attorney, Agent, or Firm* — Law Offices of Peter H. Priest, PLLC

(57) ABSTRACT

Techniques are described for improving accuracy and speed of video fingerprinting and identification by using video frame color and intensity information. Multiple approaches for generating a novel signature based on video frame color information are described. One is based on spatial distribution of pixel intensities with reference to derived color groups, while another is based on thresholding a joint histogram of pixel intensity, color, and spatial coordinates. These color based signatures can be deployed either as primary video content signatures, or as hash traversal signatures used to improve speed of an initial stage of video data base search procedures. They can also be used as secondary signatures during a video signature data base search with primary video content signatures, to help disambiguate possible false positive matches, and to improve marginal matches which might not be identified otherwise.

13 Claims, 12 Drawing Sheets

Region of interest (ROI) 401

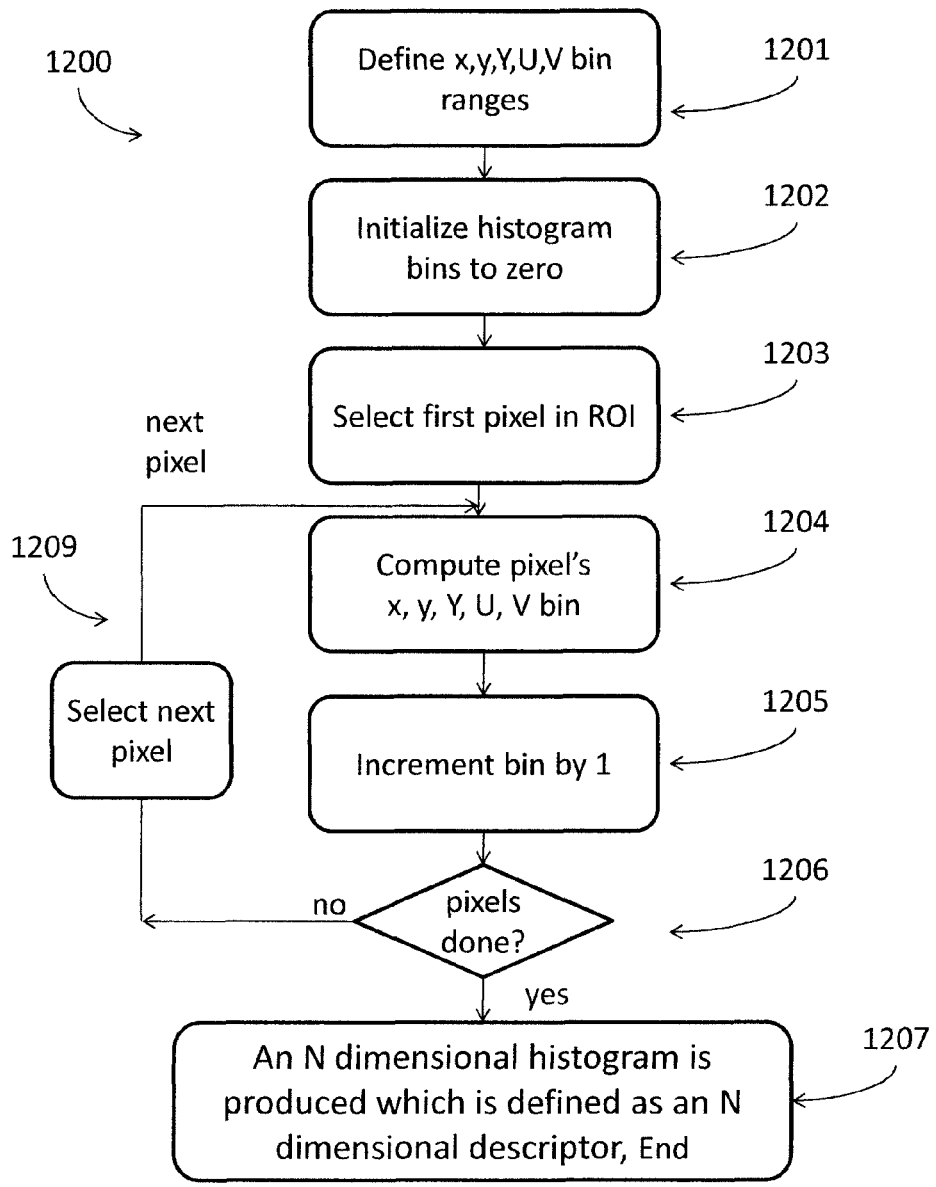

DIGITAL VIDEO CONTENT FINGERPRINTING USING IMAGE PIXEL INTENSITY AND COLOR INFORMATION

CROSS REFERENCE TO RELATED APPLICATION

The patent applications entitled "Digital Video Content Fingerprinting Based on Scale Invariant Interest Region Detection with an Array of Anisotropic Filters", U.S. application Ser. No. 12/612,729 filed on Nov. 5, 2009, "Digital Video Fingerprinting Based on Resultant Weighted Gradient Orientation Computation", U.S. application Ser. No. 12/491,896 filed on Jun. 25, 2009, and "Methods and Apparatus for Providing a Scalable Identification of Digital Video Sequences" U.S. application Ser. No. 12/141,163 filed on Jun. 18, 2008, have the same assignee as the present application, are related applications, and are hereby incorporated by reference in their entirety.

FIELD OF THE INVENTION

The present invention relates generally to improvements in video processing architectures and methods for feature extraction from a digital video sequence. More particularly, the present invention addresses methods and apparatuses for video sequence structuring, subsequent video frame feature extraction, and efficient signature generation for large video database indexing and search.

GENERAL BACKGROUND OF THE INVENTION

Video applications which include video database management, video database browsing and video identification are undergoing explosive growth and are expected to continue to grow. To address this growth, there is a need for a comprehensive solution related to the problem of indexing of a video sequence database and the identification of a particular video sequence or sequences within that database. Major applications include large video database mining and identifying similar videos for purposes, such as, copyright protection, advertising and surveillance. Due to the large size of such databases and the density of video files, high performance, accurate video identification and search technologies are needed. Furthermore, robust video content identification, management, and copyright protection must be resistant to intentional or unintentional video content change or distortion within the limits of parameters, such as, reasonable viewability. The overall design should be scalable to efficiently handle very large databases of videos and an arbitrary length of a query sequence.

Increasing demand for such solutions, which include standard definition (SD) and high definition (HD) formats of video, requires increasing sophistication, flexibility, and performance in the supporting algorithms and hardware. The sophistication, flexibility, and performance that are desired exceed the capabilities of current generations of software based solutions, in many cases, by an order of magnitude.

SUMMARY OF THE INVENTION

In one or more of its several aspects, the present invention recognizes and addresses problems such as those described above. To such ends, an embodiment of the invention applies a method for video frame spatio-color descriptor generation. A region of interest ROI is determined within an active region of a video frame. Pixels in the ROI are partitioned into multiple color groups. The ROI is sub-divided into multiple subregions. A multiple dimension spatio-color descriptor is constructed for the active region by accumulating in the ROI weighted pixel intensities in each color group of the multiple color groups within each subregion of the multiple subregions.

Another embodiment of the invention addresses a method for video frame descriptor generation. A histogram with multiple histogram bins indexed with a 5-tuple (x,y,Y,U,V) is formed for a region of interest (ROI) in a video frame active region. A multiple dimension descriptor is constructed for the ROI by counting pixels in the multiple histogram bins indexed by the 5-tuple (x,y,Y,U,V).

Another embodiment of the invention addresses a method for video frame signature generation using spatio-color descriptor thresholding. Each dimension of a multiple dimension spatio-color descriptor is compared with multiple thresholds to determine a corresponding numeric value representative of a range between two of the multiple thresholds. The corresponding numeric values are concatenated to create a video frame signature.

Another embodiment of the invention addresses a method for video frame signature generation based on projections onto pseudo-random vectors. Each member of a set of K N-dimensional pseudo-random descriptor values is pre-computed to a pseudo-random number between 0 and 1 to produce a set of K N-dimensional pseudo-random descriptors. A set of inner product multiplications of a multiple dimension descriptor with each of the K N-dimensional pseudo-random descriptors is generated to produce a set of K scalar dot product values. A median of the K scalar dot product values is generated to be used as a threshold. The threshold is compared with each of the K scalar dot product values producing a zero if the comparison indicates a scalar dot product value is less than or equal to the threshold and producing a one otherwise to form a K-bit signature.

A more complete understanding of the present invention, as well as further features and advantages of the invention, will be apparent from the following Detailed Description and the accompanying drawings.

BRIEF DESCRIPTION OF THE DRAWINGS

FIG. 12 illustrates color histogram descriptor generation process in accordance with an embodiment of the present invention.

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer readable storage medium having computer usable program code embodied in the medium. Any suitable computer readable medium may be utilized including hard disks, CDROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript®, Visual Basic®, TSQL, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module storing non-transitory signals executed by a processor, or in a combination of the two. A software module may reside in RAM memory, flash memory, ROM memory, EPROM memory, EEPROM memory, registers, hard disk, a removable disk, a CDROM, or any other form of storage medium known in the art. A computer-readable storage medium may be coupled to the processor through local connections such that the processor can read information from, and write information to, the storage medium or through network connections such that the processor can download information from or upload information to the storage medium. In the alternative, the storage medium may be integral to the processor.

Figure 1:
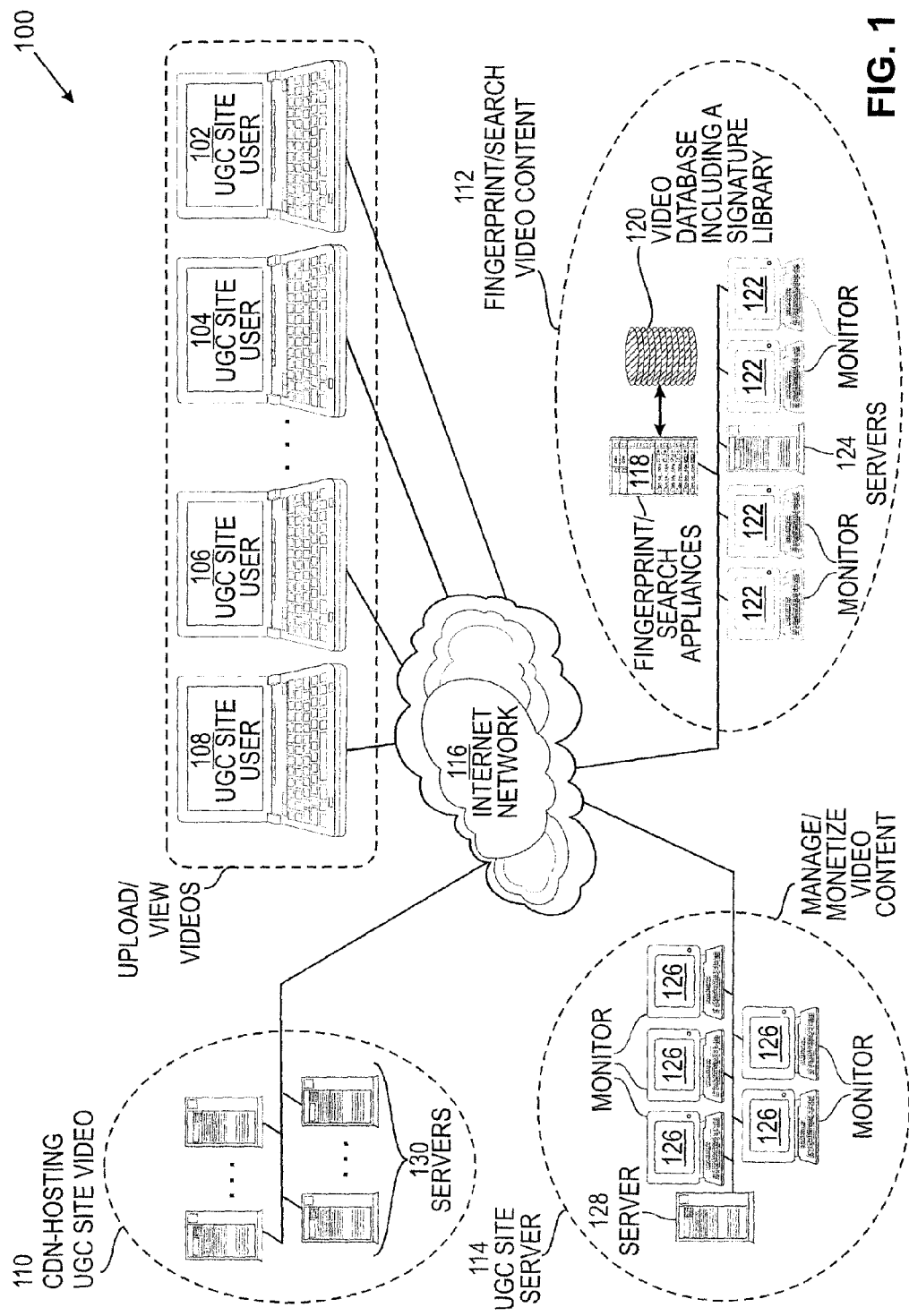
FIG. 1 illustrates an Internet networking system for content based video fingerprinting and identification in accordance with an embodiment of the present invention.

FIG. 1 illustrates a system 100 for both video fingerprinting and identification, and video content based management in accordance with an embodiment of the present invention. As used herein, a video fingerprint is a plurality of calculated numerical values, alternatively termed a signature, which represents a prominent feature of a video frame. A collection of signatures drawn from a single video frame with multiple features generates a compact video frame representation, while a collection of signatures associated with each video frame in a video sequence with multiple frames forms the video sequence representation. The approach represented by system 100 targets user generated content (UGC) Internet web sites. User sites 102-108 generate user video content which is uploaded to a UGC Internet web company where it may be stored in a server and storage subsystem 128. Alternatively, the video content may be redirected to a third party server system providing service to the UGC Internet web company. For example, third party server system 110 with an array of servers 130 hosts user generated video content and provides service to the UGC Internet web company with UGC site server system 114, with their servers and storage subsystem 128 and monitors 126. A video fingerprinting and video identification system 112 utilizes a video fingerprinting and search appliance 118, a video database 120 containing a signature library, and servers 124 with user terminal/monitors 122. The Internet network 116 allows for remote system location interconnect, and information exchange and management.

The video fingerprinting and video identification system 112 in FIG. 1 is scalable and utilizes highly accurate video fingerprinting and identification technology that checks unknown video content against a database of previously fingerprinted video content, which is considered an accurate or "golden" database. The video fingerprinting and video identification system 112 is different from commonly deployed systems in that it extracts features from the video itself and does not rely on a hash of a file, metadata or the audio stream that accompanies a video. The video fingerprinting and video identification system 112 allows a UGC site server system 114 to configure a "golden" database specific to its business requirements. A self-contained video fingerprinting and search appliance 118 that is configured to sit on the Internet network 116 within the video fingerprinting and video identification system 112, compares video streams against a database of signatures in the video database 120, that has been previously generated. The video fingerprinting and search appliance 118 allows a UGC site server system 114 to automatically flag multiple copies or reoccurring versions of popular uploads, automatically flag content previously identified for removal, as well as, content identified under a takedown notice, content not appropriate for a site, such as inappropriate, violent, racist, or the like content, and to correlate results from other filtering methods.

Each of the appliances and servers, 118, 124, 128, and 130 may include a processor complex having one or more processors, having internal program storage and local user controls such as a monitor, a keyboard, a mouse, a printer, and may include other input or output devices, such as an external file storage device and communication interfaces. The video fingerprinting and search appliance 118 may store programs such as a program implementation of a content based video identification process of the present invention or have access to such programs through electronic media, such as may be downloaded over the Internet from an external server, accessed through a universal serial bus (USB) port from flash memory, accessed from disk media of various types, or the like.

The video fingerprinting and search appliance 118 has access to the video database 120 which may be accessed by software programs operating from the appliance 118, for example. The video database 120 may store the video archives, as well as all data related to inputs to and outputs from the video fingerprinting and video identification system 112, and a plurality of video fingerprints that have been adapted for use as described herein and in accordance with the present invention. It is noted that depending on the size of an installation, the functions of the video fingerprinting and search appliance 118 and the management of the video database 120 may be combined in a single server running separate program threads for each function.

The video fingerprinting and video identification system 112 may also suitably include one or more servers 124 and user terminals or monitors 122. Each of the user terminals or monitors 122 and the video fingerprinting and search appliance 118 may be connected directly to the server 124 or indirectly connected to it over a network, such as a local cabled intranet, wireless intranet, the Internet, or the like.

The video fingerprinting and search appliance 118 may comprise, for example, a personal computer, a laptop computer, or the like. The user terminals or monitors 122 may comprise a personal computer equipped with programs and interfaces to support data input and output and video fingerprinting and search monitoring that may be implemented both automatically and manually. The user terminals or monitors 122 and video fingerprinting and search appliance 118 may also have access to the server 124, and may be accessed from the server 124.

One of the user terminals or monitors 122 may support a graphical user interface utilized to setup the video fingerprinting parameters and present the search results. These terminals may further provide miscellaneous administrative functions such as user logon rights, change of user permissions, passwords, and the like.

One embodiment of the invention addresses a method for improving accuracy and speed of a video fingerprinting and identification system by using video frame color and intensity information that is complementary to the information based on edges, blobs, corners, and contours. Two novel video content signatures that are based on video frame color information are described. The first signature is based on spatial pixel intensity layout related to the associated color spatial distribution, and the other is based on a joint histogram of intensity, color and spatial position of pixels within a video frame. In some applications, the novel signatures described here may be used as standalone signatures, however they are intended to be used as secondary signatures, supplementing feature based primary signatures to help disambiguate possible false video matches and to improve marginal video matches which might not be identified otherwise. For example, if the primary signatures have been derived based on the video luminance component only, it is statistically possible to generate a false signature matching decision during the query and reference video correlation process. For this case, if the query color signatures correlate well to the reference color signatures, then the score of the primary signature match would be boosted, conversely, if the query color signatures do not correlate with the reference color signatures, the score of the primary signature match would be decreased. By increasing or decreasing the overall query signature matching score, a more precise decision can be made in identifying the matching video. Either or both signatures can be used for this purpose in a multilevel video matching process.

Figure 2:
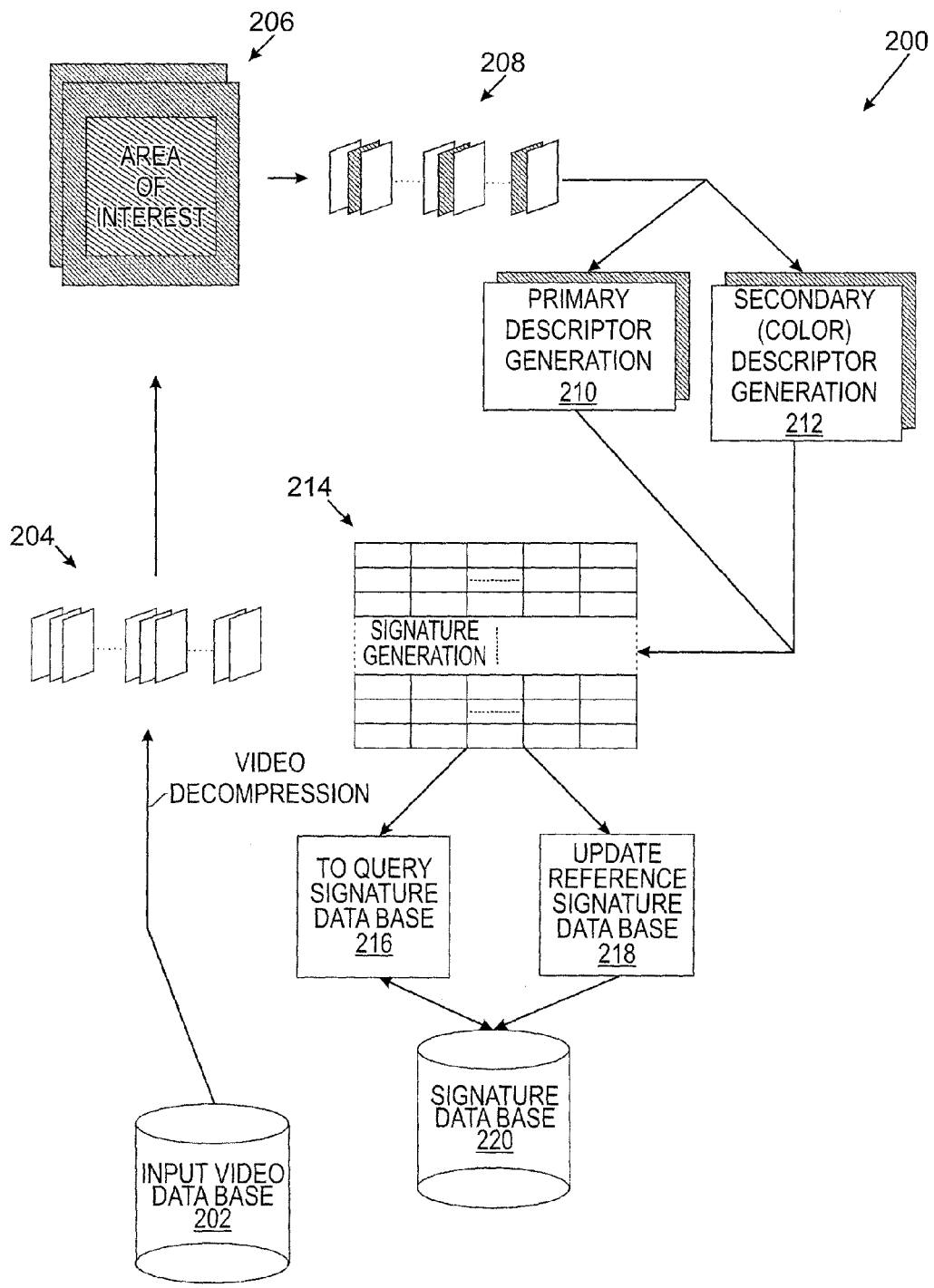
FIG. 2 illustrates a process for content based video feature extraction, signature generation, and database formation in accordance with an embodiment of the present invention.

FIG. 2 illustrates a process 200 for content based video feature extraction, signature generation, and database formation and search in accordance with an embodiment of the present invention. For use herein, a video sequence is defined as a plurality of video frames presented sequentially in time. As shown in FIG. 2, the basic functionality of a video sequence signature database formation consists of selecting a video sequence in step 204 from a video database in access step 202, and processing the video sequence in a series of process steps 206, 208, 210, 212, 214, and 218 in connection with the process 600 of FIG. 6. An analysis process step 206 includes processing a video sequence by video frame filtering for noise reduction and desired active region determination for each video frame as described in more detail below.

The active region of a video frame is determined in step 206 which uses a procedure briefly described in the following text, and described more thoroughly in U.S. application Ser. No. 12/491,896, Jun. 25, 2009, and U.S. application Ser. No. 12/612,729, Nov. 5, 2009 the details of which are incorporated by reference herein. Active regions of the video frame are determined by examining the video frame's horizontal and vertical boundaries with respect to a total normalized average brightness of the entire video frame, combined with examination of the overall activity of the frame boundaries. The active region determination is based on a three pass process. During a first pass of the video frame active region determination process, frame boundaries are examined line by line in horizontal and vertical direction to determine preliminary inactive boundary areas. The process is based on comparison of a normalized brightness value computed for each successive line with the overall video frame normalized brightness value. The process advances through successive lines at the frame boundaries in both horizontal and vertical direction, starting from the frame outermost lines, until it reaches a line with a normalized brightness greater than a certain percentage of the overall normalized brightness computed for the entire frame. This step determines four preliminary boundaries for the frame active region. In a second pass, an activity measure is derived for each of the preliminary boundary regions, based on a gradient vector intensity computed for each pixel and a normalized sum of the gradient vector intensities computed for each region. The activity measure for each identified boundary region is compared against an activity threshold and based on this comparison, a decision is made whether to go into the third step of active region determination, or accept the preliminary active region boundaries determined in the first step. The third pass of the active region determination is a repeat of the first step of the boundary region line brightness examination, but with an adjusted percentage of the normalized average brightness computed for the entire frame used as a threshold parameter for comparison. After the third pass, the boundaries of the active region are determined for the frame, and the inactive frame regions are discarded. The process of active region determination is repeated for each frame of a video sequence.

In step 208, temporal statistics are collected for each video sequence, and based on these temporal statistics, a set of video frames is selected for further spatial processing. Frame selection uses a procedure described in detail in U.S. application Ser. No. 12/141,163, Jun. 18, 2008, the details of which are incorporated by reference herein.

In step 210, spatial video frame analysis is performed to determine a set of primary descriptors, while in step 212, spatial video frame analysis is performed to determine a set of secondary, color layout based, descriptors as described in connection with the process 600 of FIG. 6 and the process 900 of FIG. 9. Regions of interest are also determined at step 212. At step 214, a signature generation process constructs a set of primary signatures and secondary color signatures as described in more detail below in connection to histogram and spatio-color signature generation process 1000 of FIG. 10, process 1100 of FIG. 11, and process 1200 of FIG. 12. An update process step 218 is utilized to insert a set of compact primary and secondary signatures into the signature database in access step 220 to be used for video sequence search and identification.

As the output of the above processing, a number of results are presented including a count of similar videos found, a count of not identified videos, statistics with respect to precise timing of matching video reference frames, and a confidence factor associated with each identified video.

A similar process is followed in a video sequence search and identification process. A compressed or raw video sequence to be identified is provided, for example, from a video database in access step 202 and processed in a series of process steps 204, 206, 208, 210, 212, 214, and 216. The query process 216 includes processing to deliver a set of videos closely matching the original compressed or raw video sequence.

Spatial domain video frame processing for color feature detection is described next. Several interest regions may be identified for a frame, and a full size signature as well as a short, hash signature is generated for each interest region. For example, each signature may be based on pixel intensity data within the corresponding interest region in the frame. Two complementary secondary color signatures that are based on the pixel color data may also be generated. This color data is represented in terms of red, green, and blue (RGB) video components, or luminance Y, and chrominance Cb, Cr (YCbCr), or equivalently luminance Y, and chrominance U, V (YUV) components. A signature can be generated for a given interest region, or for the entire frame.

Figure 3:
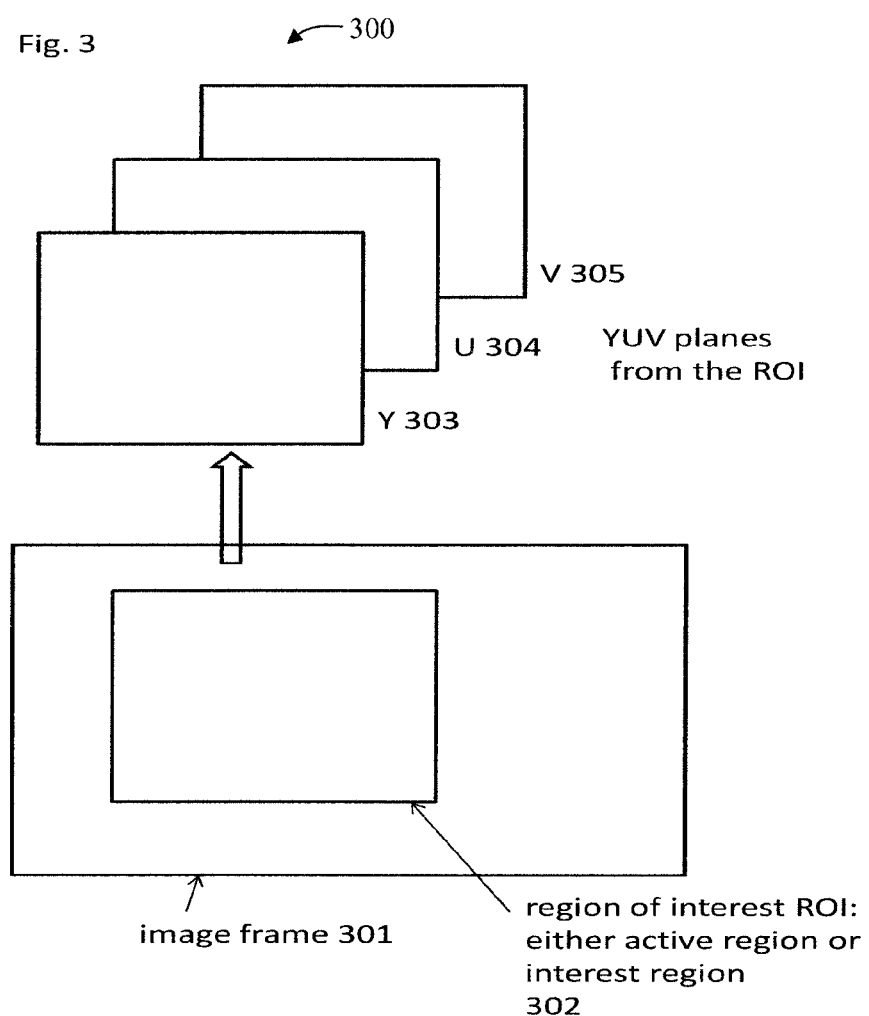
FIG. 3 illustrates an exemplary set of Y, U and V color planes for a given region of interest of pixels in a video frame.

FIG. 3 illustrates a YUV color representation 300 having an exemplary set of Y plane 303, U plane 304, and V plane 305 for a given region of interest of pixels in a video frame. When generating a signature for the entire video frame, an active region of the video frame is determined. Once the active region has been determined, similar procedures are used regardless of whether the entire active region of a video frame 301 is used for descriptor generation, or an interest region of smaller size inscribed in the active region is used for signature generation. Either of these regions is called a region of interest (ROI) 302, as shown in FIG. 3.

Two different methods of producing a color signature from the color video frame data are described based on the color representation of a video frame, with available Y plane 303, U plane 304, and V plane 305 components. If an RGB or other color representations is used as an input, the pixel data is first converted to a YUV component representation using a transform matrix. Color data can also be represented natively in the YUV component representation with several formats. One format is YUV444, where the Y, U and V color planes all have identical sizes. Another format is YUV422, where the Y component is at full resolution and the U and V components are at half the resolution horizontally. Yet another format is YUV420, where the Y component is at full resolution and the U and V components are at half the resolution horizontally and half the resolution vertically. If the YUV component data is represented with down-sampled chrominance components, such as YUV420 or YUV422, then the components can be appropriately resampled to result in three identical size Y, U and V color planes, such as the YUV444 format. As shown in FIG. 3, the ROI 302 within the video frame 301 is partitioned into the Y plane 303, U plane 304 and V plane 305.

Figure 4:
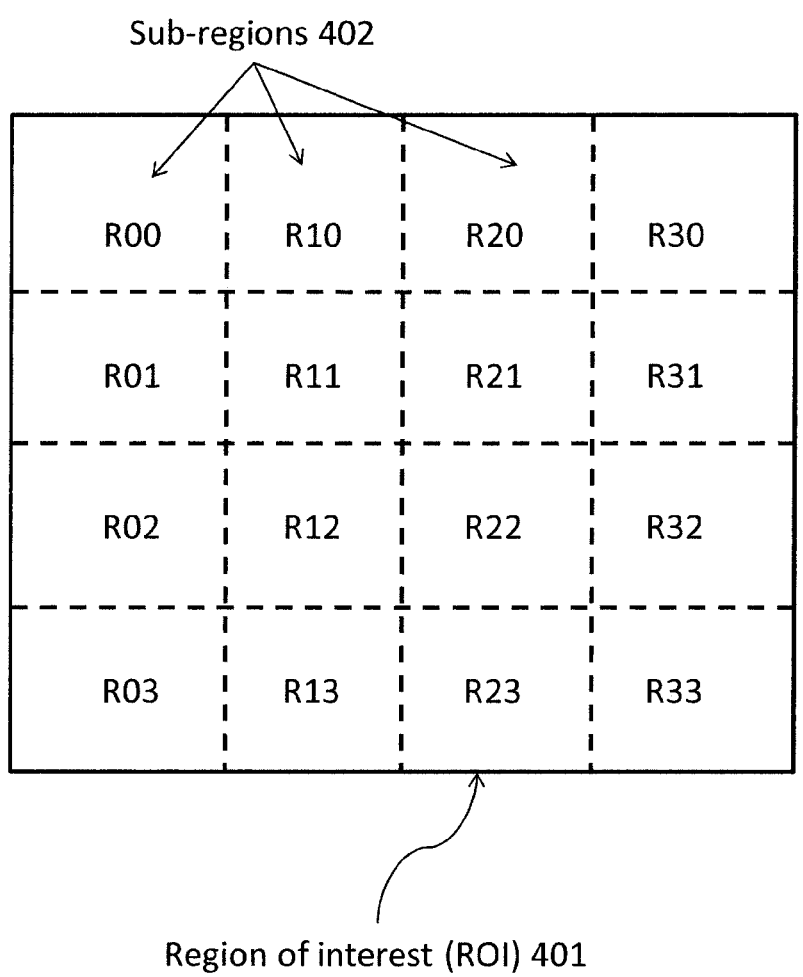
FIG. 4 illustrates an exemplary partition of the region of interest of pixels into subregions used for further analysis.

FIG. 4 illustrates an exemplary partition 400 of the region of interest of pixels into subregions used for further analysis. In one possible arrangement, the ROI 302 of FIG. 3 may be divided into 16 equal subregions 402, with 4 subregions in the horizontal direction and 4 subregions in the vertical direction, as illustrated in the partition 400 of FIG. 4. Other subdivisions are equally possible. For example, 5 subregions in the horizontal direction and 5 subregions in the vertical direction may be used to form total of 25 subregions. The subregions in FIG. 4 are labeled $R_{CR}$, for example, $R_{00}$, $R_{01}$, $R_{02}$, $R_{03}$, $R_{10}$, $R_{11}$, ..., $R_{33}$, where the first number, subscript R, indicates a horizontal division and the second number, subscript C, indicates the vertical division.

Figure 5:
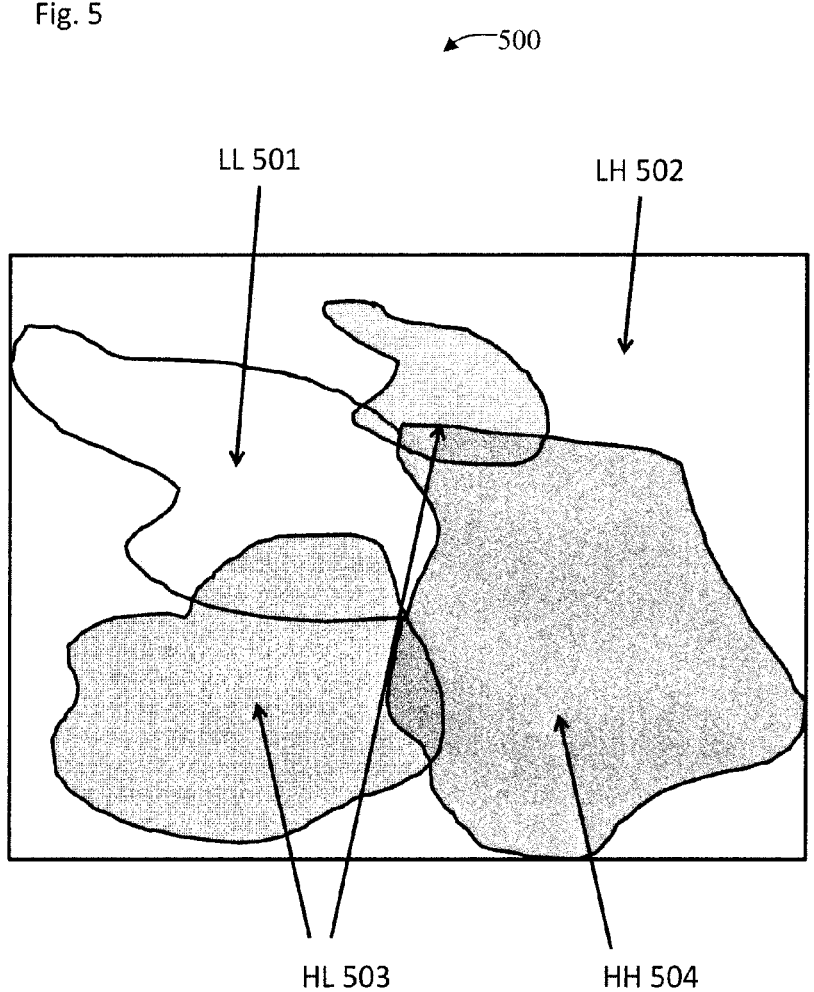
FIG. 5 illustrates an exemplary partition of the region of interest of pixels into multiple color groups, computed according to the color values of pixels.

Considering the image pixels within the ROI 302, a median pixel value of the U plane 304 denoted by label MU and a median pixel value of the V plane 305 denoted by label MV are calculated. The median values can each be an integer value or a non-integer, fractional value. Based on these median values, four color groups of pixels 500 are defined as illustrated in FIG. 5. Group LL 501 with U pixels≤MU+TU and V pixels≤MV+TV, group LH 502 with U pixels≤MU+TU and V pixels≥MV−TV, group HL 503 with U pixels≥MU−TU and V pixels≤MV+TV, and group HH 504 with U pixels≥MU−TU and V pixels≥MV−TV. The values identified by labels TU and TV are heuristic threshold parameters, each representing a distance from the associated median value.

A pixel could belong to more than one color group, in which case that pixel gets counted in multiple bins. One example where this happens is the case when a pixel falls within the distance threshold of both TU and TV of the respective median values.

Each pixel of a subregion 402 of FIG. 4 can belong to one or more of the four different color groups. Thus, four color groups and 16 subregions form 64 counting bins. These 64 counting bins define a 64-dimensional descriptor, where each counting bin corresponds to a descriptor dimension.

Figure 6:
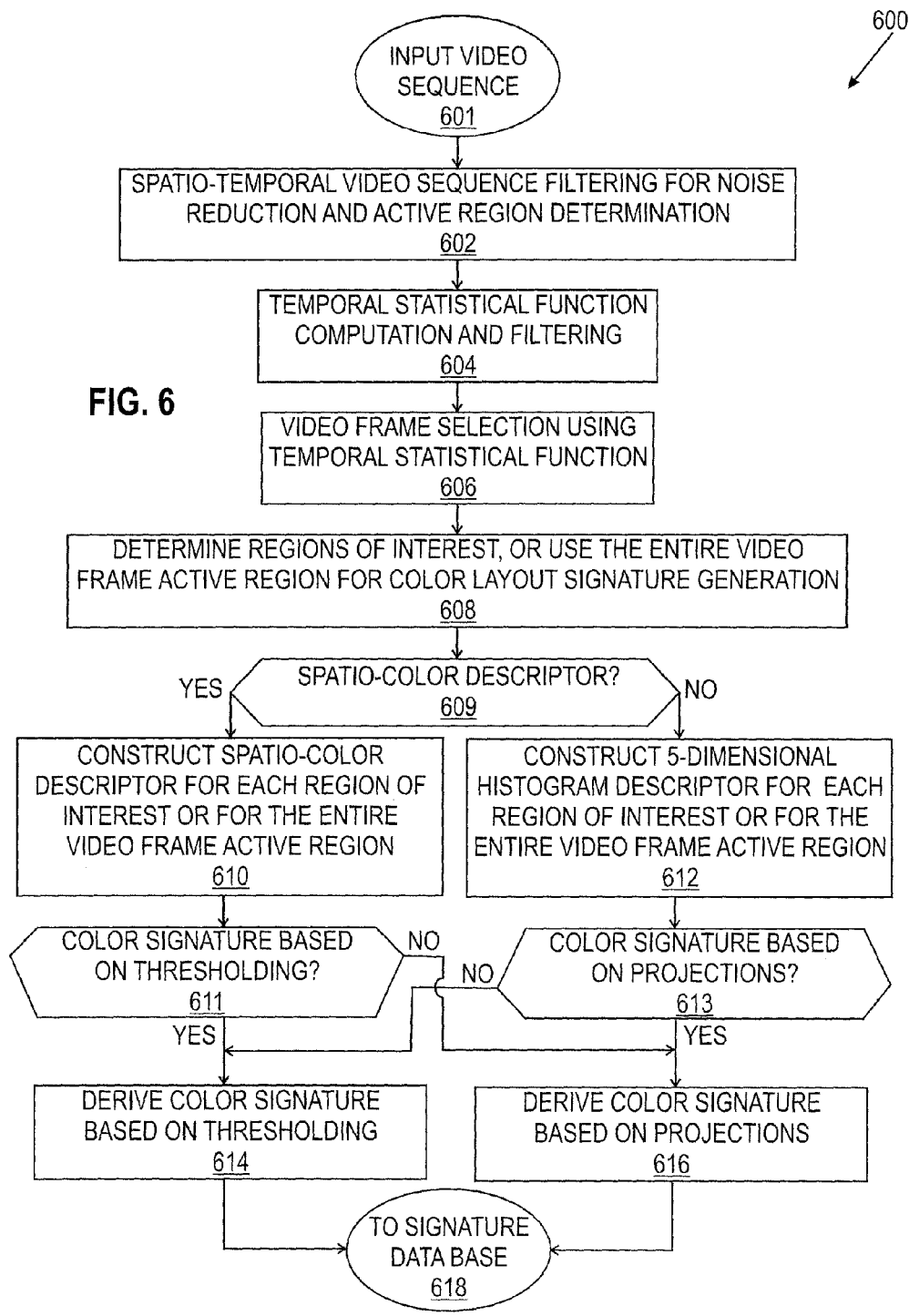
FIG. 6 illustrates a video sequence spatio-temporal process for frame selection, active region generation, and color feature extraction as part of the process of FIG. 2 in accordance with an embodiment of the present invention.

FIG. 6 illustrates a video sequence spatio-temporal process 600 for frame selection, active region generation, and color feature extraction as part of the process of FIG. 2 in accordance with an embodiment of the present invention. The process 600 includes step 602 for video frame pre-processing and active region generation, steps 604 and 606 for frame selection, and steps 608-616 for spatial video frame analysis for color descriptor and signature generation.

At step 601, a video sequence is applied as an input to the spatio-temporal process 600. At step 602, corresponding to step 206 of FIG. 2, spatio-temporal video sequence filtering for noise reduction and active region determination are performed. At steps 604 and 606, corresponding to step 208, temporal statistical function computation and filtering and video frame selection using temporal statistical function are performed. At steps 608, corresponding to step 212, regions of interest are determined or the entire video frame active region is used for color layout signature generation. At decision step 609, a determination is made whether to generate a spatio-color descriptor. Following the determination at decision step 609 to generate a spatio-color descriptor, at step 610, a spatio-color descriptor is constructed for each region of interest or the spatio-color descriptor is constructed for the entire video frame active region. At step 612, following the decision at step 609 to not generate a spatio-color descriptor, a 5-dimensional histogram descriptor is constructed for each region of interest or for the entire video frame active region. At decision step 611, a determination is made whether to derive a color signature based on a thresholding process. With a determination at the decision step 611 to not use a thresholding process, the process 600 proceeds to step 616. At decision step 613, a determination is made whether to derive a color signature based on a projection process. With a determination at the decision step 613 to not use a projection process, the process 600 proceeds to step 614. With a determination to use the thresholding process based on the decision steps 611 and 613, the process 600 proceeds to step 614. At step 614, a color signature based on thresholding is derived. With a determination to use the projection process based on determinations at decision steps 611 and 613, the process 600 proceeds to step 616. At step 616, a color signature based on projections is derived. At step 618, signatures are sent to the signature data base, such as the signature database 220 of FIG. 2.

Figure 7:
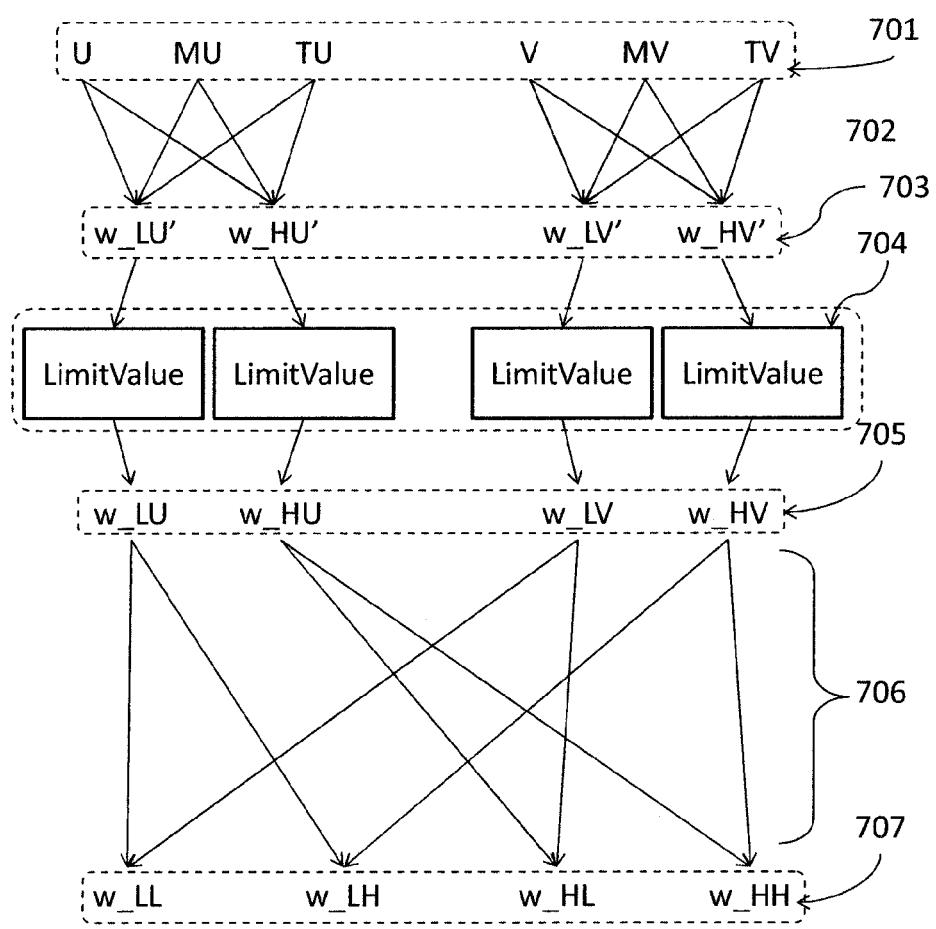
FIG. 7 illustrates a process of computing color weights in accordance with an embodiment of the present invention.

FIG. 7 illustrates a process 700 of computing color weights in accordance with an embodiment of the present invention. Given a pixel with color components YUV, weighting factors 705, such as w_LL, w_LH, w_HL, and w_HH, are computed for each color bin based on the color value. At step 701, the inputs comprising pixel U and V values, the computed median values MU and MV, and the preset threshold values TU and TV are applied. At step 702, a first set of partial weighting factors are computed.

$$w\_LU'=(MU+TU-U)/TU$$

$$w\_HU'=(U-MU+TU)/TU$$

$$w\_LV'=(MV+TV-V)/TV$$

$$w\_HV'=(V-MV+TV)/TV$$

At step 703, the first set of partial weighting factors is applied to limiting step 704. At step 704, a second set of partial weighting factors is generated according to:

$$w\_LU=\text{LimitValue}((MU+TU-U)/TU)$$

$$w\_HU=\text{LimitValue}((U-MU+TU)/TU)$$

$$w\_LV=\text{LimitValue}((MV+TV-V)/TV)$$

$$w\_HV=\text{LimitValue}((V-MV+TV)/TV).$$

The function "LimitValue" limits the first set of partial weighting factors to a maximum of 1 and a minimum of 0, according to:
LimitValue(x)={0, if x<0;
  1, if x>1;
  x, otherwise}.

At step 705, the second set of partial weighting factors is applied at step 706 to compute a final set of weighting factors for each of the color groups as follows:

$$w\_LL=w\_LU*w\_LV$$

$$w\_LH=w\_LU*w\_HV$$

$$w\_HL=w\_HU*w\_LV$$

$$w\_HH=w\_HU*w\_HV.$$

At step 707, the final set of weighting factors are output.

Figure 8:
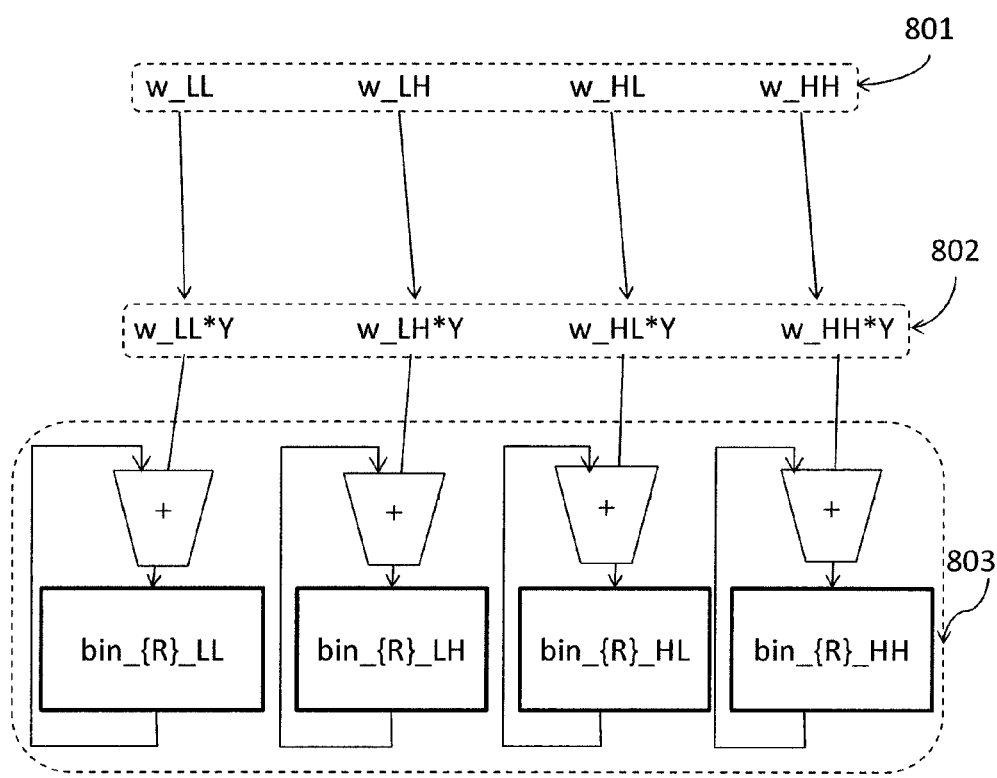
FIG. 8 illustrates a process of updating color/subregion bins in accordance with an embodiment of the present invention.

FIG. 8 illustrates a process 800 of updating color subregion bins in accordance with an embodiment of the present invention. At step 801, the final set of weighting factors output from step 705 are applied. At step 802, the final set of weighting factors are multiplied by a pixel's Y component for each color bin, for example, w_LL*Y is calculated for bin_{R}_LL for the subregion {R} to which it belongs. Similarly, w_LH*Y, w_HL*Y, and w_HH*Y are calculated. At step 803, the calculated w_LL*Y, w_LH*Y, w_HL*Y, and w_HH*Y are accumulated in bin_{R}_LL, bin_{R}_LH, bin_{R}_HL, and bin_{R}_HH*Y, respectively. After processing the pixels, the resulting sums in the 64 bins are used as the 64 descriptor values.

Figure 9:
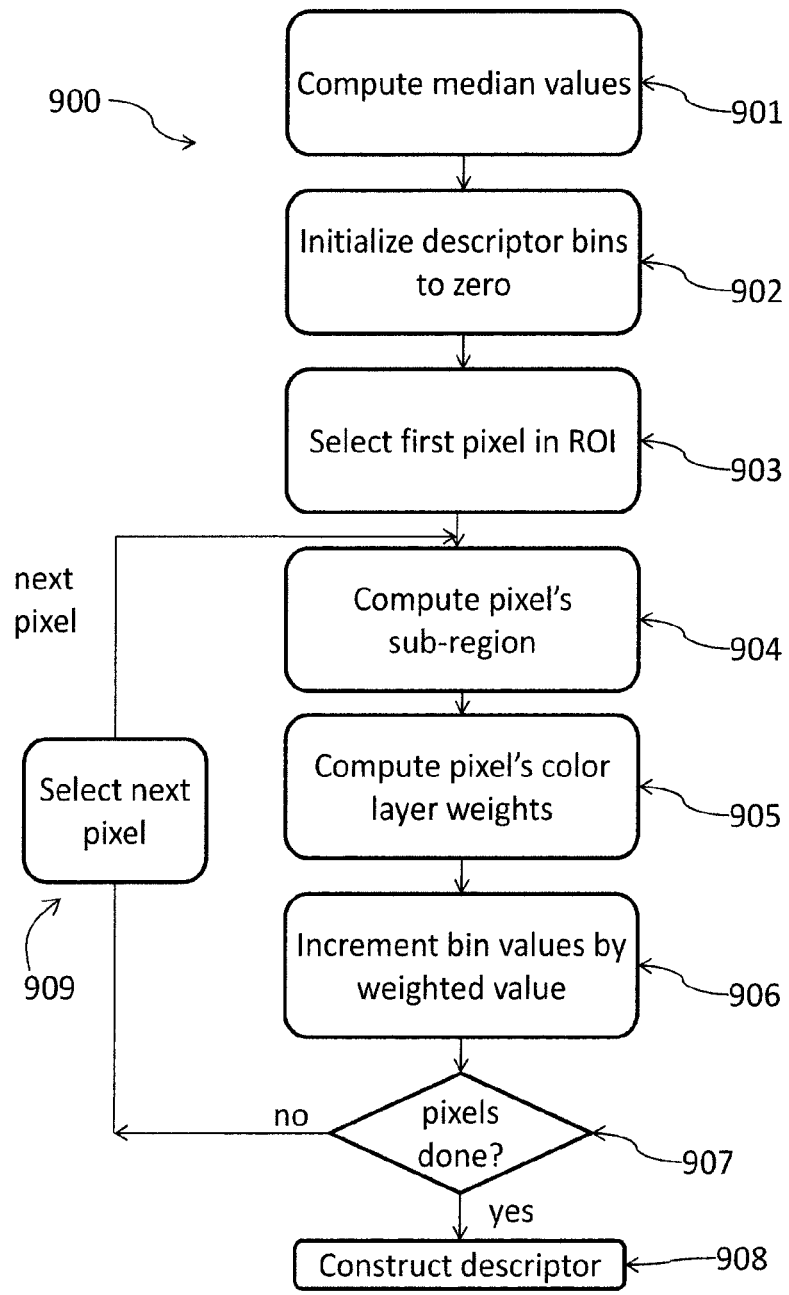
FIG. 9 illustrates a spatio-color descriptor generation process in accordance with an embodiment of the present invention.

FIG. 9 illustrates a spatio-color descriptor generation process 900 in accordance with an embodiment of the present invention. At step 901, median values, MU and MV described earlier, are computed. At step 902, descriptor bins also referred to as counting bins are initialized to zero. The descriptor bins contain values that correspond to each dimension of a multi-dimensional descriptor. The pixels in the region of interest, such as ROI 401, are processed in a loop beginning with selecting a first pixel at step 903, and then repeating steps 904, 905 and 906 for each next pixel selected in step 909. When the pixels in the region of interest 401 are evaluated as indicated in step 907, a multi-dimensional descriptor is constructed in step 908.

The ROI is subdivided in 16 equal areas called subregions, as described in FIG. 4. The ROI is partitioned horizontally by a factor of four and vertically by a factor of four, resulting in a 4×4 grid superimposed upon the ROI which produces the 16 subregions. These subregions are denoted $R_{00}, R_{01}, \ldots, R_{03}, R_{10}, \ldots, R_{33}$. Each pixel in the region of interest 401 belongs to exactly one of the 16 subregions, and contributes to the four bins that correspond to the four color groups for a subregion. Each pixel can contribute to any or all of the four color bins in a subregion.

The process 900 for generating a spatio-color descriptor is applied for computing an exemplary 64-dimension descriptor as begins at step 901. At step 901, median values MU and MV for an ROI are computed. At step 902, the 16 subregions×4 color bins, bin_R00_LL, bin_R00_LH, bin_R00_HL, bin_R00_HH, bin_R01_LL, bin_R01_LH, bin_R01_HL, bin_R01_HH, ..., bin_R33_HH, for a total of 64 color bins are initialized to zero. At step 903, first pixel in the ROI is selected. Beginning at step 904, starting from the first pixel and for each pixel p, of value Y,U,V, in the ROI, a subregion R to which pixel p belongs is computed. At step 905, color group weights based on U, V, MU, MV, TU, TV≥w_LL, w_LH, w_HL, w_HH are computed according to the process 700 of FIG. 7 described above. At step 906, the following bin values are incremented by the computed weighted values:

$$\text{bin\_}\{R\}\_LL+=w\_LL*Y \qquad \text{a.}$$

$$\text{bin\_}\{R\}\_LH+=w\_LH*Y \qquad \text{b.}$$

$$\text{bin\_}\{R\}\_HL+=w\_HL*Y \qquad \text{c.}$$

$$\text{bin\_}\{R\}\_HH+=w\_HH*Y \qquad \text{d.}$$

where +=denotes add and accumulate according to the process 800 of FIG. 8 described above. At step 907, a determination is made whether pixels in the ROI have been processed. If the pixels in the ROI have not been processed, the process 900 proceeds to step 909. At step 909 a next pixel to be processed is selected and then the process 900 proceeds to step 904 to continue processing of the selected next pixel. After the pixels in the ROI have been processed, the process 900 proceeds to step 908. At step 908, a descriptor is constructed according to the subregions of interest 402 of FIG. 4 from the 64 color bins (D0, ..., D63)=(bin_R00_LL, bin_R33_HH).

Figure 10:
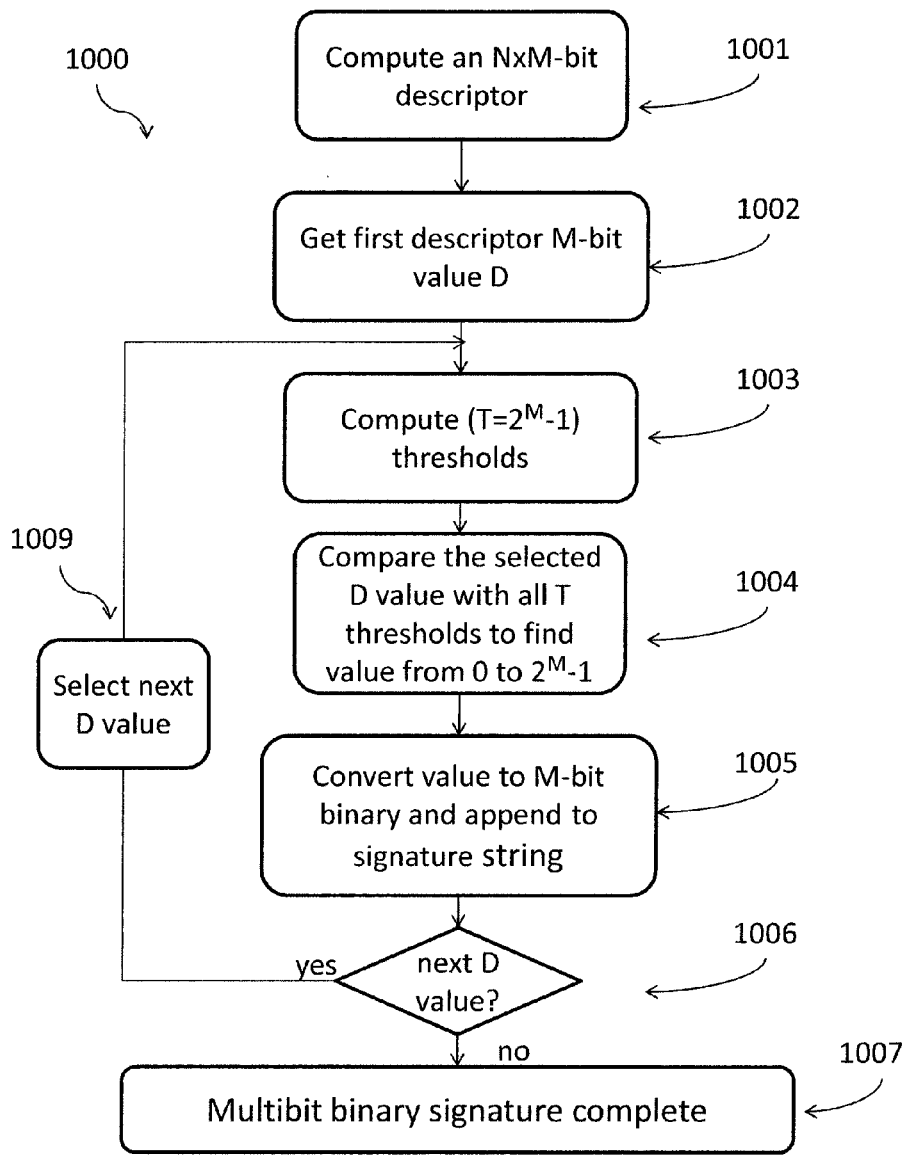
FIG. 10 illustrates a first signature formation process based on spatio-color descriptor thresholding in accordance with an embodiment of the present invention.

Starting from the 64-dimensional descriptor, produced according to the process 900 above, a signature can be generated in one of two ways. FIG. 10 illustrates a first signature formation process 1000 based on spatio-color descriptor thresholding in accordance with an embodiment of the present invention. To generate a full size signature, the descriptor dimensions produced in the process 900 are used in step 1001. Each of the descriptors dimensions, that is, numerical values, is mapped to an M-bit binary number.

These M-bit binary numbers are concatenated together to produce an N×M-bit signature, or for the case of the 64-dimension descriptor, a 64×M-bit signature. In the simplest case, M=1, each numerical value in the descriptor is mapped to a 1-bit binary number, that is, either 0 or 1. This mapping is accomplished by comparing the numerical value of the descriptor dimension to a threshold value T. This threshold value may be arbitrarily set, to obtain particular statistics on the distribution of 0's and 1's in the signatures, or may be set according to some rule. For instance, the threshold value could be set to Davg, the average numerical value of all the descriptor dimensions. The bits that are produced for each dimension are concatenated together to form a 64-bit signature.

For the case of M=2, each numerical value in the descriptor is mapped to a 2-bit binary number: 0 (00 in binary), 1 (01 in binary), 2 (10 in binary) or 3 (11 in binary). This mapping is accomplished by comparing the numerical value of the descriptor dimension to three threshold values: Thres0, Thres1, Thres2, where Thres0≤Thres1≤Thres2. If the numerical value is less than Thres0, the result is the number 0 (00); if the numerical value is greater than or equal to Thres0 but less than Thres1, the result is the number 1 (01); if the numerical value is greater than or equal to Thres1 but less than Thres2, the result is the number 2 (10); and if the numerical value is greater than or equal to Thres2, then the result is the number 3 (11). As with the case M=1, the threshold values could be arbitrarily set, so long as the obey Thres0≤Thres1≤Thres2, or they could be based on some rule: Thres0=Davg/2, Thres1=Davg; Thres2=3*Davg/2. The bits that are produced for each dimension are concatenated together to form a 128-bit signature.

For the general case for any M, each numerical value in the descriptor is mapped to an M-bit binary number. This mapping is accomplished by comparing the numerical value of the descriptor to $T=2^M-1$ threshold values: Thres0, Thres1, Thres(T−1), where Thres0≤Thres1≤ . . . ≤Thres(T−1). As before, based on the comparison, the numerical value of the descriptor dimension is mapped to a value between 0 and T, inclusive, which is converted to an M-bit binary number (since $T=2^M-1$). The bits that are produced for each dimension are concatenated together to form a 64×M-bit signature.

This procedure is illustrated in the process 1000, where each of the descriptor's N×M-bit dimension values is processed in succession, starting at step 1002 with a first selected M-bit descriptor dimension value, continuing to the next descriptor dimension value selected at step 1009 until the dimension values have been processed as determined at step 1006. At step 1003, for each descriptor value, one or more threshold values are generated. For instance, for a 1-bit per dimension signature, producing a complete 64-bit signature, a single threshold value could be based on the average 64-dimensional descriptor value Davg computed as the sum of 64 descriptor values (dimensions) divided by 64. For a 2-bit-per-dimension signature, producing a 128-bit signature, 3 threshold values are used. As an example, these threshold values could be: Davg/2, Davg, 3*Davg/2, producing equidistant threshold levels. For a 3-bit per dimension signature, seven thresholds would be needed. These or other threshold values may be selected based on experimental results. In general, for an M-bit/dimension signature, $2^M-1$ threshold values are used. Alternatively, instead of thresholding each descriptor dimension value with Davg, a threshold value may be selected that changes for each descriptor value. This threshold value may be experimentally determined based on observation regarding the relative average strengths of the various color groups. For instance, all descriptor dimensions of a particular color group may be given the same threshold value that is different from the threshold value for the descriptor corresponding to another color group.

At step 1004, each descriptor value is compared against each of the selected threshold values, in order, to find an index i. If a descriptor value is greater than an $i^{th}$ threshold and less than an $(i+1)^{th}$ threshold, then the descriptor value is mapped to index i. Allowable threshold bin values are, for example, 0, . . . , T−1, where "$T^{th}$", or maximum threshold can be considered to be infinity. At step 1005, an index is converted to an M-bit binary representation and appended to a signature in the process of being created. Before beginning the loop, the signature is empty. The signature is composed of 64 M-bit binary number concatenated in sequence, according to the procedure detailed here. This process 1000 is followed for each descriptor value to produce an N×M-bit signature, for an N-dimensional descriptor. For example, a value of N equal to 64 may be suitably used. At step 1007, the multibit binary signature is complete.

Figure 11:
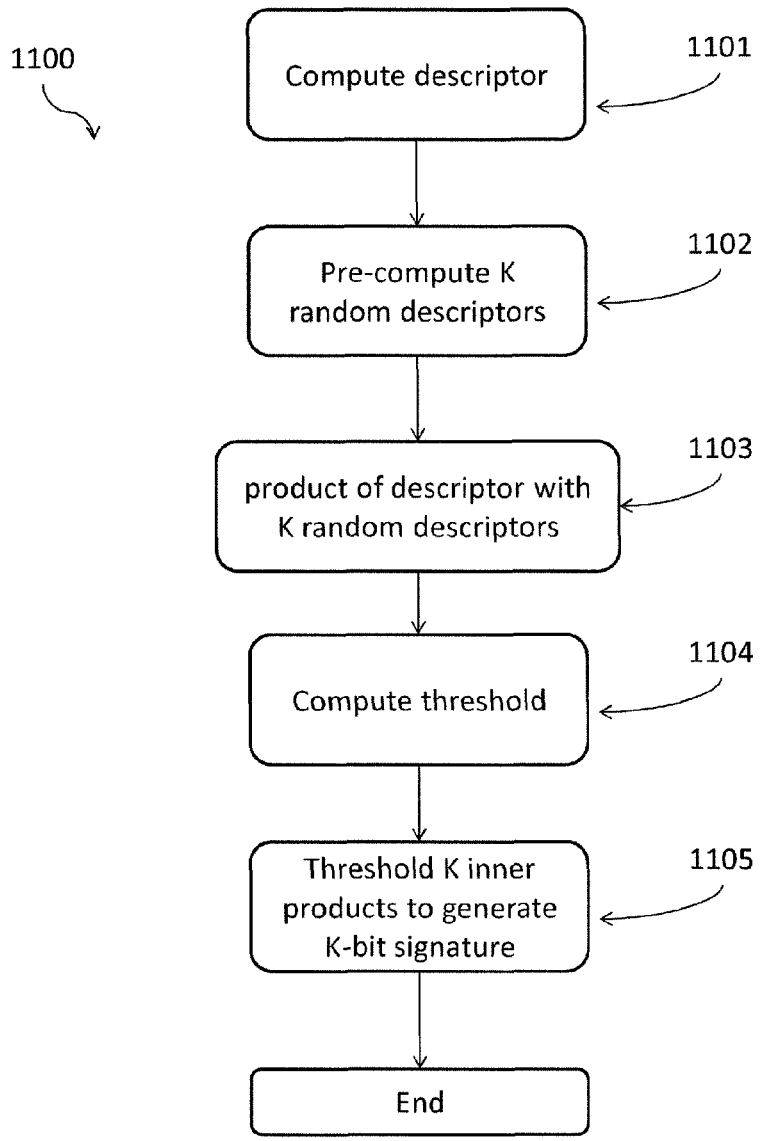
FIG. 11 illustrates a second signature formation process based on spatio-color descriptor projections onto pseudo-random vectors in accordance with an embodiment of the present invention.

FIG. 11 illustrates a second signature formation process 1100 based on spatio-color descriptor projections onto pseudo-random vectors in accordance with an embodiment of the present invention. The second signature formation process 1100 uses pseudo-random projections. A general process for an N-dimensional descriptor and a K-bit signature derived from the N-dimensional descriptor, is illustrated by process 1100 in FIG. 11. At step 1101 a descriptor is computed, either using the process 900 of FIG. 9 described above for the spatio-color signature or using a color histogram signature process described in further detail below with regards to process 1200 of FIG. 12. At step 1102, a set of K N-dimensional pseudo-random descriptors is pre-computed. For example, each of the K×N pseudo-random descriptor values is pre-computed to a pseudo-random number between 0 and 1 using a pseudo-random generator or other suitable means to provide a uniform distribution of descriptor values. This set of pseudo-random descriptors need only be generated once, and in fact, should be re-used for consistent signatures; hence, this step is called pre-computation. The pseudo-random descriptors are numbered from 0 to K−1 Each of the K pseudo-random descriptors is of dimension N, thus there are K×N values. At step 1103, the descriptor from step 1101 is multiplied with each of the K pseudo-random descriptors, to give a corresponding set of K resulting scalar dot product values. The multiplication is an inner product of the input descriptor and pseudo-random descriptor, each considered to be N-dimensional vectors. That is, the sum of the element-by-element product over the N dimensions is computed.

At step 1104, a median of the K scalar dot product values is computed and set as a threshold. At step 1105, this threshold is compared with each of the K scalar dot product values, producing a 0 if the comparison indicates a scalar dot product value is less than or equal to the threshold, and producing a 1 otherwise, to form a K-bit signature. A comparison with an $i^{th}$ scalar dot product value, produced by the $i^{th}$ pseudo-random descriptor, generates an $i^{th}$ bit of the signature. The process 1100 can be used to generate a 64-bit signature from a 64-dimensional descriptor.

A signature of shorter bit length with respect to what has been described in previous text can be generated by either the first process 1000 based on thresholding described in reference to FIG. 10 or by the second process 1100 using pseudo-random projections described in reference to FIG. 11. In the first process 1000, combines descriptor values and appropriately thresholds the sum, using the process detailed in FIG. 10. To obtain shorter signatures the step 1001 of computing a descriptor is extended by combining, for example adding, descriptor values to create a different and shorter descriptor. For example, in a first approach, the previously calculated descriptor values corresponding to each color group are added to give four descriptor values: D0', D1', D2', D3':

$$D0'=D0+D4+\ldots+D60$$

$$D1'=D1+D5+\ldots+D61$$

$$D2'=D2+D6+\ldots+D62$$

$$D3'=D3+D7+\ldots+D63$$

This corresponds to the combined descriptor D'.

In an alternative method, the descriptor values corresponding to each subregion are added to give 16 descriptor values: D0", D1", . . . , D15":

$$D0''=D0+D16+D32+D48$$

$$D1''=D1+D17+D33+D49$$

. . .

$$D15''=D15+D31+D47+D63$$

This corresponds to the combined descriptor D". The two alternative methods of combining descriptors constitutes the first step 1001 of the signature generation procedure of FIG. 10. The remainder of the procedure follows as before, repeated here for convenience but with the use of the new descriptors. At step 1003, for each descriptor value selected from D' or D", one or more threshold values are generated. For instance, for a 1-bit-per-dimension signature, a single threshold value could be based on the average descriptor value, such as D'avg or D"avg. For a 2-bit-per-dimension signature, 3 threshold values are used. As an example, these threshold values could be: D'avg/2, D'avg, 3*D'avg/2. In general, for an M-bit-per-dimension signature, $2^M-1$ threshold values are used, that are monotonically increasing. Alternatively, instead of thresholding each descriptor value with D'avg, a threshold value can be used that changes for each descriptor value. This threshold value may be based on observation regarding the relative average strengths of the various color groups. For instance, all descriptor dimensions of a particular color group may be given the same threshold value that is different from the threshold value for the descriptor dimensions corresponding to another color group.

At step 1004, each descriptor value is compared against each of the threshold values, in order, to find the threshold bin. If the descriptor value is greater than an $i^{th}$ threshold and less then an $(i+1)^{th}$ threshold, then the descriptor value maps to threshold bin i. Allowable threshold bin values are 0, . . . , T−1. The "$T^{th}$" or maximum threshold can be considered to be infinity. At step 1005, a threshold bin index is converted to an M-bit binary representation and appended to the signature. This procedure is followed for each descriptor value D' or D" to produce an (N×M)-bit signature, for an N-dimensional descriptor, where N is 4 for D' and N is 16 for D". In the example of the two shorter signatures, for M=2, a 4M-bit=8-bit signature and an 16M-bit=32-bit signature would be used.

The second method for generating shorter signatures uses pseudo-random projections. The general procedure for an input N-dimensional descriptor and an output K-bit signature, illustrated in FIG. 11 and described above is adjusted. For example, the number K representing the output signature size is changed to a desired number of bits that is less than N and the process 1100 is followed. For example, K may be set to 64 which produces a 64-bit descriptor. To obtain a shorter descriptor, K may be reduced to 32 to produce 32-bit descriptors.

An alternative color signature generation process uses a 5-dimensional histogram of spatial and color information of pixels in the region of interest. The five dimensions correspond to the pixel spatial location x and y, and the pixel color values Y, U and V.

FIG. 12 illustrates color-histogram descriptor generation process 1200 in accordance with an embodiment of the present invention. At step 1201, bin ranges are defined for each of the five dimensions. Spatial x and y values are defined relative to the corner of the ROI, with the width 'w' and height 'y' of the ROI given as well. The x and y values are divided into two bins each represented by an x-bit and a y-bit, with width/2 and height/2, respectively, as the dividing lines, for example. For the Y (luminance) values, four bins are used represented by 2-bits, evenly dividing between 0 to 255 into four ranges, or a range of 16 to 239 divided into four partitions, for example, or any other reasonable range. For the U and V chrominance values, two bins are used each represented by a U-bit and a V-bit, each evenly dividing the range 0 to 255, for example, or any other reasonable range. This gives a total of 2×2×4×2×2=64 bins in this 5-dimension histogram represented by a 5-tuple (one x-bit, one y-bit, two Y-bits, one U-bit, one V-bit). Other values for the number of bins in each dimensions and the total number of histogram bins can also be used. At step 1202, the bins of the histogram are initialized to zero. At step 1203 a first pixel is selected. At step 1204, starting from the first pixel, the pixel value (x,y,Y,U,V) in conjunction with the bin ranges above are used to compute a bin index, in this case, a bin index between 0 and 63. At step 1205, the bin value is incremented by 1. After the pixels in the region of interest selected in step 1209 are processed as determined at step 1206, an N-dimensional histogram is produced, which is used as an N-dimensional descriptor. For example, a value of N equal to 64 may be used. At step 1207, an N dimensional histogram is produced which is defined as an N dimensional descriptor and the process 1200 ends.

In order to generate a primary signature, either of the two processes described above may be used. For example, the thresholding process 1000, detailed in FIG. 10, may be used to generate an N×M-bit signature. Alternatively, the pseudo-random projections process 1100, detailed in FIG. 11, may be used to generate a K-bit signature. To generate a shorter signature, descriptor values 1001 may be combined, to give an N/m-dimensional descriptor, and generate an (N/m)×M bit signature according to the method 1000 in FIG. 10. The value "m" may be determined depending on the desired size of the shorter signature. This approach is equivalent to choosing different numbers of bins and bin ranges. Alternatively, a small value for K may be chosen and the pseudo-random projections method 1100 used according to FIG. 11, to generate a K-dimension signature.

The color signatures described above can be used as standalone primary signatures, with the corresponding shorter signature as the hash traversal signature used to speed up the initial stage of the video data base search.

In addition to the primary signatures, the color signatures can be used in a complementary manner to existing primary signatures with two major benefits. First, the color signature can be used in a secondary correlation process used on signature matches that have been identified in a large signature database. For example, if the primary signatures have been derived based on the video luminance component only, it is statistically possible to generate a false signature matching decision during the query and reference video correlation process. For this exemplary case, if the query color signatures correlate well to the reference color signatures, then the score of the primary signature match would be boosted. Conversely, if the query color signatures do not correlate with the reference color signatures, the score of the primary signature match would be decreased. By increasing or decreasing the overall query signature matching score, a more precise decision can be made in identifying the matching video. For instance, for an otherwise marginal signature match, the color signature could be used as an aid to either accept or reject the marginal match. Advantageously, the color signature generally would not affect a particularly weak or strong match.

Second, short size color signatures can be used to enhance an existing hash traversal signature to speed up an initial stage of the video data base search. This enhanced hash traversal signature can lead to increased speed of the search and improved accuracy of video identification in a large video signature data base environment.

Those of skill in the art will appreciate from the present disclosure additional alternative systems and methods for color layout based video content signature generation, in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those of ordinary skill in the art may be made in the arrangement, operation and details of the method and apparatus of the present invention disclosed herein without departing from the spirit and scope of the invention.

We claim:

1. A method for video frame spatio-color descriptor generation, the method comprising:
    determining a region of interest (ROI) within an active region of a video frame;
    partitioning pixels in the ROI into multiple color groups;
    subdividing the ROI into multiple subregions;
    constructing a multiple dimension spatio-color descriptor for the active region by accumulating in the ROI weighted pixel intensities in each color group of the multiple color groups within each subregion of the multiple subregions;
    determining median pixel values of chrominance components of a YUV color representation for each pixel of each subregion;
    determining the multiple color groups and partial weighting values within a limit range based on the median pixel values; and
    determining weighting values based on a multiplicative combination of the partial weighting values, wherein the weighting values are assigned to color bins associated with the multiple color groups and are used to calculate the weighted pixel intensities.

2. The method of claim 1, further comprising:
    applying the determined weighting values to each corresponding pixel luminance component to calculate weighted pixel intensity values; and
    accumulating the weighted pixel intensity values in corresponding color bins, wherein each corresponding color bin represents a dimension of a multiple dimension spatio-color descriptor.

3. The method of claim 1, wherein a number N of dimensions of the multiple dimension spatio-color descriptor is equal to the number of subregions times the number of color groups.

4. The method of claim 1, further comprising:
    converting a red, green, and blue (RGB) color video input to a YUV color representation for each region of interest pixel using a transform matrix prior to constructing the multiple dimension spatio-color descriptor.

5. A method for video frame spatio-color descriptor generation, the method comprising:
    partitioning pixels in each region of interest (ROI) of a selected video frame into multiple subregions for each ROI, wherein each subregion is configured with multiple color groups and each selected video frame having multiple ROIs;
    constructing a multiple dimension spatio-color descriptor for each ROI by accumulating in each ROI weighted pixel intensities in each color group of the multiple color groups within each subregion of the multiple subregions;
    determining median pixel values of chrominance components of a YUV color representation for each pixel of each subregion of each ROI;
    determining partial weighting values based on a function of pixel chrominance values, the median pixel values, and threshold chrominance values; and
    determining weighting values based on a multiplicative combination of the partial weighting values, wherein the weighting values are assigned to color bins associated with the multiple color groups and are used to calculate the weighted pixel intensities.

6. The method of claim 5 further comprising:
    applying the determined weighting values to each corresponding pixel luminance component to calculate weighted pixel intensity values; and
    accumulating the weighted pixel intensity values in corresponding color bins, wherein each corresponding color bin represents a dimension of a multiple dimension spatio-color descriptor.

7. The method of claim 5 further comprising:
    applying a calculated weighting value to each corresponding pixel luminance component of the pixels in each subregion of each ROI to calculate weighted pixel intensity values; and
    accumulating the weighted pixel intensity values in corresponding color bins associated with the multiple color groups, wherein each color bin represents a dimension of the multiple dimension spatio-color descriptor.

8. The method of claim 5 further comprising:
    comparing each dimension of the multiple dimension spatio-color descriptor of each ROI with multiple thresholds to determine a corresponding numeric value representative of a range between two of the multiple thresholds, wherein each color group represents a dimension of the multiple dimension spatio-color descriptor; and
    concatenating the corresponding numeric values to create a color signature for each ROI.

9. The method of claim 8 further comprising:
    selecting primary signatures derived based on video luminance components that match with reference signatures from a large signature database to determine a signature matching score; and
    adjusting the signature matching score based on the color signature for each ROI.

10. A computer readable non-transitory medium encoded with computer readable program data and code, the program data and code executes to:

determine a region of interest (ROI) within an active region of a video frame;

partition pixels in the ROI into multiple color groups;

subdivide the ROI into multiple subregions;

construct a multiple dimension spatio-color descriptor for the active region by accumulating in the ROI weighted pixel intensities in each color group of the multiple color groups within each subregion of the multiple subregions;

determine median pixel values of chrominance components of a YUV color representation for each pixel of each subregion;

determine the multiple color groups and partial weighting values within a limit range based on the median pixel values; and determine weighting values based on a multiplicative combination of the partial weighting values, wherein the weighting values are assigned to color bins associated with the multiple color groups and are used to calculate the weighted pixel intensities.

11. The computer readable non-transitory medium of claim 10 further executes to:

apply the determined weighting values to each corresponding pixel luminance component to calculate weighted pixel intensity values; and accumulate the weighted pixel intensity values in corresponding color bins, wherein each corresponding color bin represents a dimension of a multiple dimension spatio-color descriptor.

12. The computer readable non-transitory medium of claim 10, wherein a number N of dimensions of the multiple dimension spatio-color descriptor is equal to the number of subregions times the number of color groups.

13. The computer readable non-transitory medium of claim 10 further executes to:

convert a red, green, and blue (RGB) color video input to a YUV color representation for each region of interest pixel using a transform matrix prior to constructing the multiple dimension spatio-color descriptor.

* * * * *